No. 772,191. PATENTED OCT. 11, 1904.
J. THOMSON.
BRICK LAYING MACHINE.
APPLICATION FILED MAY 9, 1904.
NO MODEL. 9 SHEETS—SHEET 1.

Witnesses:
Harry B. White.
Ray White.

Inventor:
John Thomson
By Howard M. Cox
Atty.

No. 772,191. PATENTED OCT. 11, 1904.
J. THOMSON.
BRICK LAYING MACHINE.
APPLICATION FILED MAY 9, 1904.
NO MODEL. 9 SHEETS—SHEET 2.

Fig. 2.

Witnesses:
Harry R. White
Ray White

Inventor:
John Thomson,
By Howard M. Cox
Atty.

No. 772,191. PATENTED OCT. 11, 1904.
J. THOMSON.
BRICK LAYING MACHINE.
APPLICATION FILED MAY 9, 1904.
NO MODEL. 9 SHEETS—SHEET 3.

Fig. 3.

Witnesses:
Harry A. White.
Ray White.

Inventor:
John Thomson
By Howard M. Cox
Atty.

No. 772,191. PATENTED OCT. 11, 1904.
J. THOMSON.
BRICK LAYING MACHINE.
APPLICATION FILED MAY 9, 1904.
NO MODEL. 9 SHEETS—SHEET 6.

Witnesses:
Harry R. Lylute
Ray White

Inventor:
John Thomson,
By Howard M. Cox Atty.

No. 772,191. PATENTED OCT. 11, 1904.
J. THOMSON.
BRICK LAYING MACHINE.
APPLICATION FILED MAY 9, 1904.
NO MODEL. 9 SHEETS—SHEET 9.

Witnesses:
Harry P. White
Ray White

Inventor
John Thomson
By Howard M. Cox
Atty.

No. 772,191.

Patented October 11, 1904.

UNITED STATES PATENT OFFICE.

JOHN THOMSON, OF CHICAGO, ILLINOIS.

BRICK-LAYING MACHINE.

SPECIFICATION forming part of Letters Patent No. 772,191, dated October 11, 1904.

Application filed May 9, 1904. Serial No. 207,063. (No model.)

*To all whom it may concern:*

Be it known that I, JOHN THOMSON, a citizen of the United States, residing at Chicago, in the county of Cook and State of Illinois, have invented a certain new and useful Improvement in Brick-Laying Machines, of which the following is a specification.

My invention relates to machines for laying bricks in building-walls; and the objects of the invention are, first, to provide a machine which is supported upon the wall itself and is movable along the wall bodily as a complete apparatus, the purpose being to avoid the laying of tracks or guides either upon the wall itself or at a point adjacent thereto; second, to make the machine reversible, whereby it may proceed to lay a course of bricks in one direction and subsequently return in the opposite direction and lay a second course of bricks without being lifted from the wall; third, to provide a machine which will lay any different arrangement of headers and stretchers, so as to form a complete course across a wall of any width; fourth, to provide means whereby the wall may be made with "shove-joints," produced by moving the bricks longitudinally and laterally to final position upon the bed of mortar, thereby causing the mortar to be forced upward at the joints between the ends and sides of the brick; fifth, to provide various details of construction pointed out more fully in the following description and accompanying claims. I attain these objects by the mechanism illustrated in the accompanying drawings, in which—

Fig. 11 is a fragmentary plan view showing the construction of the scraper for removing the excess of mortar from the side of the wall.
Fig. 12 is a perspective view looking in the direction of the arrow, Fig. 11.

Similar reference characters denote similar parts throughout the several views.

The various parts of the machine naturally divide themselves into different groups which will be described under the following headings, to wit: the carriage, whereby the remainder of the mechanism is supported upon the wall, the inner frame for supporting the operating parts, the motar-holder, the storage and delivery mechanism for the bricks, the brick-setting mechanism, the clamping devices adapted to coöperate with the delivery mechanism, and the brick-alining mechanism.

The carriage comprises the longitudinal beams $a$, the transverse beams $b$, the guide members $c$, attached, preferably, to said beams $b$ and located front and rear on each side of the wall for carrying the guide-rollers $c'$ $c'$, whereby said carriage maintains its position laterally upon the wall. There are two of the rollers $c'$ upon each of the members $c$, one near the lower extremity and the other so located as to travel along the side of the wall at or near the last completed course of bricks. Said carriage is supported upon trucks at each end thereof, which trucks consist of the bolster $d$, mounted on the wheels or rollers $d'$ $d'$. In order that said trucks may be vertically adjustable with reference to the beams which they support, a jack-screw $d^4$ rises from each of said bolsters and enters a hand-operable nut $d^2$, which forms a support whereon beams $b$ rest. A boss or sleeve $d^3$ should be attached to the beams $b$ for slidingly receiving the square threads of the screws $d^4$ for steadying the same. The trucks should be four in number, a pair at each end of the carriage and the trucks of each pair as near as practicable to the edge of the wall, so that the carriage may be adjusted to lie perfectly level. A platform $e$ is provided, preferably, on each side of the carriage whereon the workmen operating the machine may stand. In the preferred construction the inner edge of each platform is hinged to the members $c$ by means of a pin $e'$, and the outer free edge of the platform is supported by means of rods or chains $e^2$, so that said platform may be folded up out of the way when not in use. The upper extremity of rods $e^2$ should be attached to the members $c$ or some other fixed part of the carriage.

Figure 4:
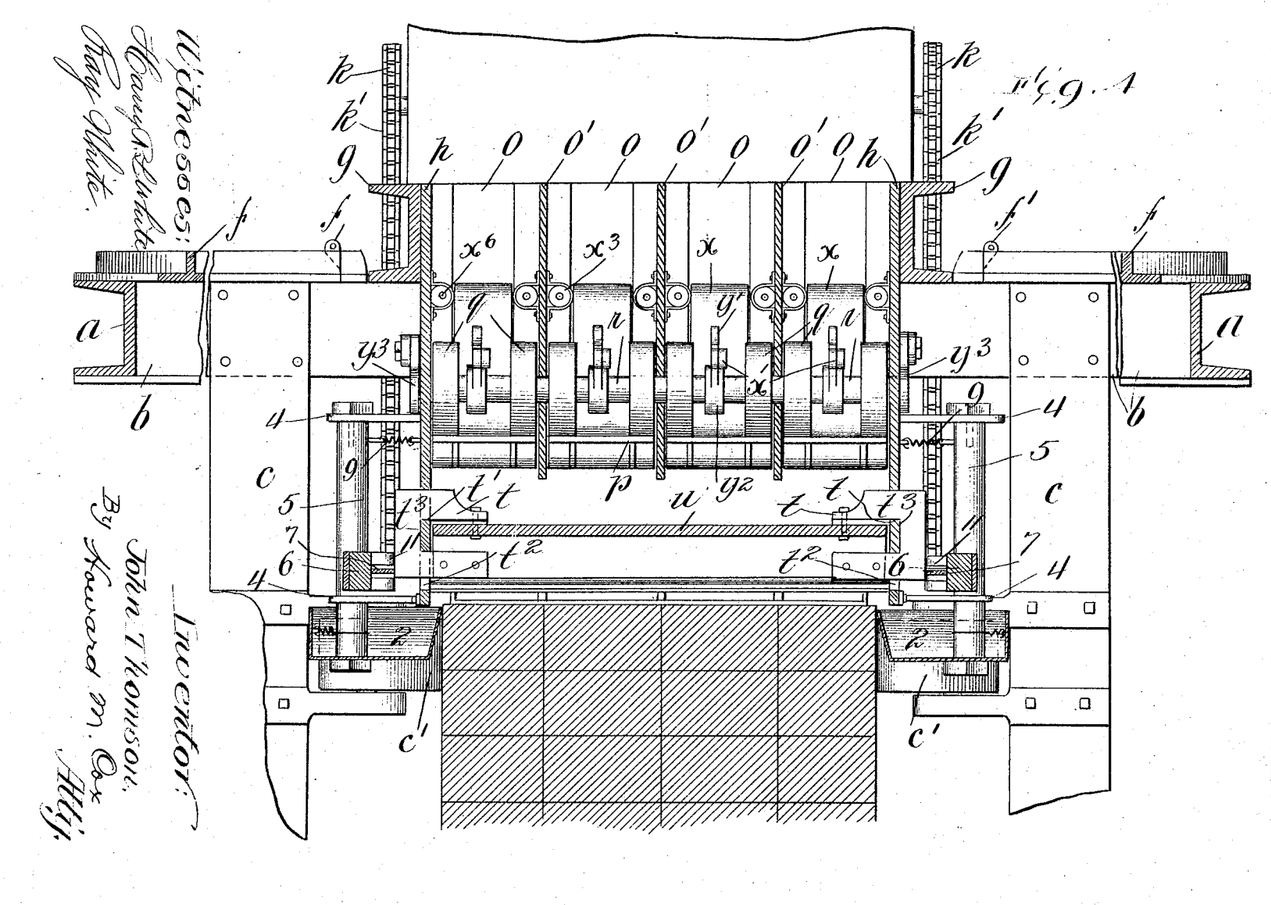
Fig. 4 is a transverse sectional view taken on line 4 4, Fig. 3.
Figures 16, 17, 18, 19:
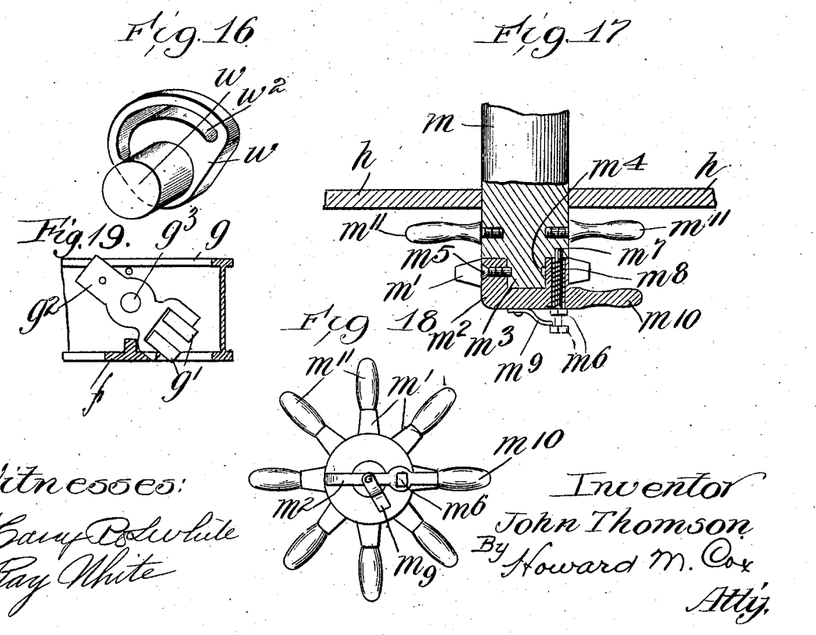
Fig. 16 is a perspective view of the clamp-operating cam, whereby the clamp and delivering floors are operated.
Fig. 17 is a fragmentary view, partly in section, showing the hand-wheel whereby the device is operated.
Fig. 18 is an end view of the parts shown in Fig. 17.
Fig. 19 is a fragmentary side view showing the construction of the rollers whereby the brick-laying parts are revolubly supported upon the exterior supporting-frame.

Rigidly mounted on top of the beams $a$ and $b$ of the carriage is the circular track $f$, which in the present instance consists of an inverted T-iron adapted to revolubly support the beams $g$ of the inner frame. The manner of supporting beams $g$ upon said track $f$ is shown in detail in Fig. 19, where there is shown a caster consisting of the rollers $g'$, mounted in the yoke $g^2$. Said yoke is pivoted to the beam $g$ by means of the pin or axle $g^3$, and the parts are so arranged that the rollers $g'$ may roll upon the horizontal flange of the T-iron $f$ and be guided laterally thereon by means of the central vertical web of said T-iron. Said casters are preferably four in number, one for each extremity of said beams $g$. Said beams are, by preference, substantially parallel and when in normal position extend lengthwise of the wall at a distance apart somewhat greater than the width of the wall. In order that there may be no danger of the beams $g$ rotating upon track $f$ when the mechanism is in operation, track $f$ is cut away at the four points where beams $g$ $g$ lie when the latter are in normal position. This permits the beams $g$ to rest directly upon the upper edge of the beams $b$, as shown in Fig. 4; but, if desired, the vertical web only of the T $f$ may be cut away, which would permit beams $g$ to rest directly upon the horizontal flange of the T-iron $f$. The width of the notch or absent portions of the track $f$ is made just large enough to receive beams $g$ without permitting lateral play, and consequently said beams will be rigidly held in operative position when lowered into said notches. It is for the purpose of permitting beams $g$ to be lowered into said notches in track $f$ that the yokes $g^2$ are pivoted to beams $g$, so that the caster-rollers $g'$ may be thrown up out of the way of the track, as shown in Fig. 19. The track should be hinged at $f'$ $f'$, so that the side portions thereof may be swung up out of the way of an operator standing upon the platform $e$. The inner frame, which is thus revolubly supported upon the traveling carriage so as to be reversible with respect thereto, comprises the said parallel beams $g$, the side plates $h$ $h$, which are fastened to and depend from said beams for carrying the movable parts of the mechanism, and the cross-beams $h'$, which extend between said plates $h$ and hold the same in proper relative position. In order to steady the inner frame, the rollers $h^2$ $h^2$ are provided near the lower edge of said plates in position to run upon the side surfaces of the wall.

Figure 13:
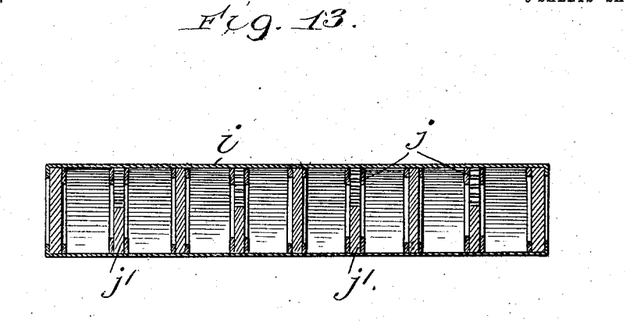
Fig. 13 is a sectional view of the mortar-chute, taken on line 13 13, Fig. 3.

The mortar-holder consists of one or more chutes, each connecting with the hopper $i'$ at its upper end and a discharge-opening $i^2$ at its lower end in position to deliver mortar upon the top of the wall for the new course of bricks. It is desirable to have the chutes separated, as shown in Fig. 13, so that delivery may be more even across the wall and so that, if necessary, mortar of a different color may be delivered at the outside of the wall. A plunger $j$ is constructed to travel lengthwise in each chute $i$ and by preference occupies substantially the entire cross-sectional area, so that when the chute is full and the plunger is moved a definite distance downward in the chute a definite quantity of mortar will be delivered onto the top of the wall. Said plunger is attached to a rack $j'$, which is operated by the pinion $j^2$ in such manner that the rotation of said pinion will control the position of plunger $j$ in chute $i$. Said pinion is secured to and rotated by means of the horizontal shaft $j^3$, journaled in the side walls of the hopper $i''$. The sprocket $k$, operated by the chain $k'$, is rigidly fixed to shaft $j^3$ for rotating the same, and said chain is operated by means of the sprocket $m'$ on the shaft $m$. The preferred manner of securing sprocket $m'$ to shaft $m$ is illustrated in detail in Fig. 17, wherein it is shown that sprocket $m'$ forms part of the hub $m^2$, which fits over the cylindrical extension $m^3$ on shaft $m$. Said extension has a circumferential groove $m^4$, adapted to receive the extremity of the screw-pin $m^5$, which screw-pin is mounted in the hub $m^2$ in such manner that when said pin $m^5$ is in place hub $m^2$ will be rotatable on shaft $m$ independently of said shaft, but will be prevented from becoming dislodged from extension $m^3$. The dowel-pin $m^6$ is mounted in hub $m^2$ in such manner as to enter a socket $m^7$ in shaft $m$, and thereby prevent the independent rotation of hub $m^2$ on shaft $m$. A spring $m^8$ is mounted in such manner as to tend to force dowel-pin $m^6$ into socket $m^7$, and a detent $m^9$, which is pivoted to hub $m^2$, is constructed in such manner as to retain dowel-pin $m^6$ out of engagement with shaft $m$ when desired. Hub $m^2$ has a handle $m^{10}$, whereby said hub and sprocket $m'$ may be rotated independent of the shaft $m$. Shaft $m$ is provided with a series of handles $m^{11}$, whereby said shaft $m$ may be rotated. The driving or friction roller $n$ is rigidly secured to shaft $m$ in position to make frictional contact with the top of the previously-laid course of bricks in such manner that when the machine is moved forward along the wall said roller will be rotated an amount proportional to the amount of motion of the machine. The rotation of roller $n$ due to the movement of the machine along the wall will when pin $m^6$ is in the socket $m^7$ cause a definite amount of rotation of shaft $j^3$, and consequently a definite amount of motion of the plunger $j$ in the chute $i$. This will result in the discharge of a definite amount of mortar from the mortar-chute onto the wall, and it will thus be seen that the amount of mortar delivered is proportionate to the distance traveled by the machine; but when plunger $j$ has reached the bottom of the chute and the chute is empty it is obvious that the plunger must be raised to the top of the chute for a fresh charge of mortar, and this raising of the plunger must take place when the machine is stationary, and consequently when the roller $n$ is still. The object of the particular construction of sprocket $m'$ on shaft $m$ thus becomes apparent, for by withdrawing dowel-pin $m^6$ sprocket $m'$ may be rotated backward by hand to raise plunger $j$ without disturbing the position of the machine upon the wall. It will be understood, therefore, that under ordinary conditions dowel-pin $m^6$ will engage shaft $m$, so that the rotation of said shaft will be imparted to sprocket $m'$, and that said dowel-pin will be withdrawn only when plunger $j$ is being raised for the admission of a new charge of mortar. The handles $m^{11}$ will ordinarily be brought into use only at the beginning of a course of bricks when there are no bricks laid in the new course against which the brick-setting device may obtain a purchase for advancing the machine. The operation of the mechanism whereby the machine is automatically advanced will more fully appear hereinafter.

Although I have minutely described the construction of the driving sprocket-wheel and its connection to shaft $m$, I do not wish to be understood as limiting myself to this precise construction, for any construction which would permit the raising of the plunger $j$ without otherwise disturbing the machine would serve the purpose.

Figure 5:
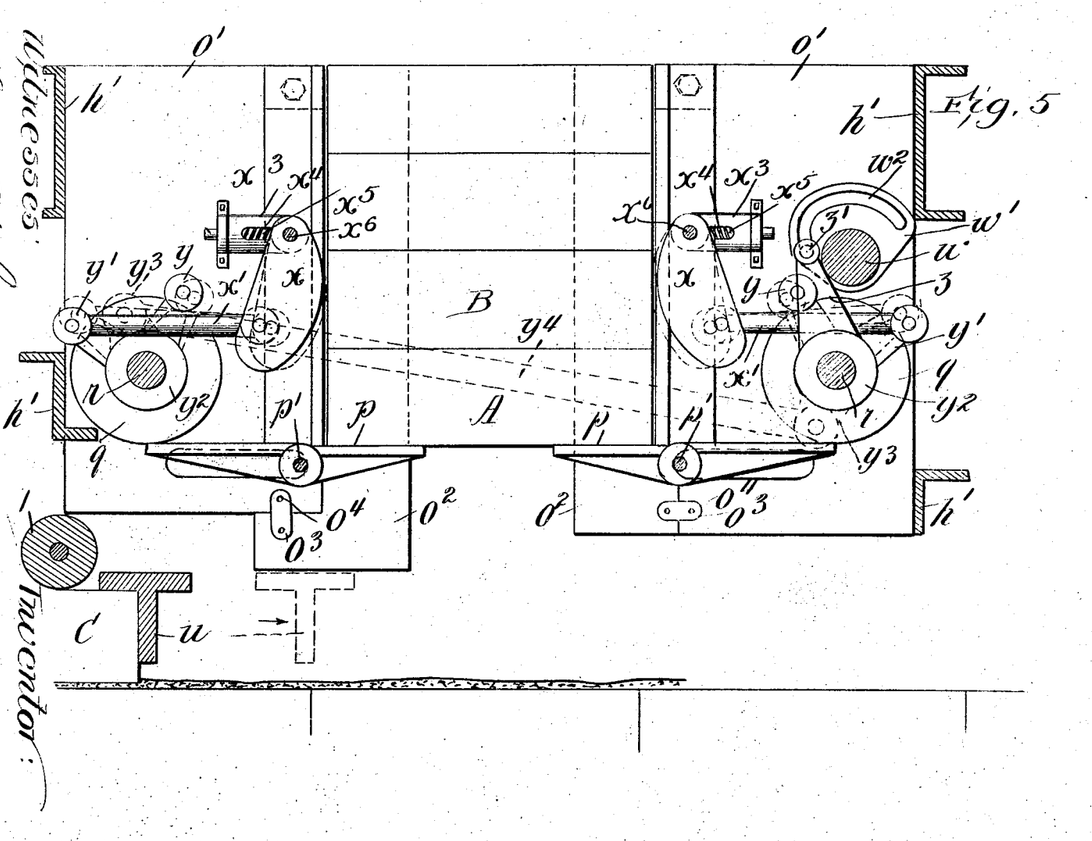
Figs. 5, 6, and 7 are side elevations of the supply-chute and a portion of the brick-delivering mechanism, illustrating the manner of operation thereof.

*Brick storage and delivery mechanism.*—Approximately in the middle of the machine between the side plates $h\ h$ are a number of chutes $o\ o$, divided by the partition-plates $o'$ and $o^2$, so as to form as many compartments as there are bricks in the width of the wall. Plates $o'$ are rigidly secured to cross-beams $h'$; but the plates $o^2$ are preferably removable, so that, if desired, bricks or tiles of double width may be laid. Said plates $o^2$ may be removably attached to plates $o'$ by means of the straps $o^3$, which are temporarily secured to plates $o'$ by means of the pins $o^4$, as best shown in Fig. 5. The bricks, which are stacked in the chutes $o$, ordinarily rest upon the floors $p\ p$, located at the bottom of the chutes and fixed upon the shafts $p'\ p'$. Said shafts are adapted to slide in a horizontal direction toward and from the chutes, and plates $h$ and $o'$ are provided with slots $p^2$ for permitting such motion of shaft $p'$. The slots $p^2$ are long enough to permit the floors $p$ to be withdrawn clear of chutes $o$, so that when said floors are in a retracted position the bricks may fall out of the chute onto the fresh mortar spread upon the top of the wall. Said shafts $p'$ are normally held in a projected position (shown in Figs. 5 and 7) by means of the springs $p^3 p^3$, which are attached at one end to said shafts and at the other end to a hook or staple $p^4$, rigidly secured upon the side plates $h\ h$. The rear extremity of the floors $p$ are prevented from tilting by means of the rollers $q\ q$, which are mounted upon the shafts $r\ r$, journaled in the side plates $h\ h$. Shafts $p'$ are moved back and forth in slots $p^2$ by means of the levers $s\ s$, which are fulcrumed on the fixed shafts $s'\ s'$. Said floor-operating levers $c$ are connected together by the links $s^2$, which are pivotally attached thereto on opposite sides of their fulcrums, so that when one of the levers $s$ is rotated about its fulcrum the other one will be rotated about its fulcrum in an opposite direction. One of said levers $s$ has an extension $s^3$, which projects into the path of the reciprocating block or cross-head $t$ in such manner that when said block strikes said extension during forward motion said extension is also moved forward, (toward the right, Fig. 1,) thereby causing levers $s$ to be rotated about their fulcrums and the floor-operating shafts $p'$ to be moved in such direction as to retract the brick-supporting floors $p$ from chutes $o$ and permit the bricks to drop from the chutes onto the wall. The floor-operating shafts are returned to normal position with the floors within the chutes by means of the springs $p^3$, above mentioned. It will be understood that the floor-operating mechanism is in duplicate—that is to say, there are blocks $t$, levers $s$, and links $s^2$ on both sides of the machine in order to obtain positiveness and facility of operation.

Figure 1:
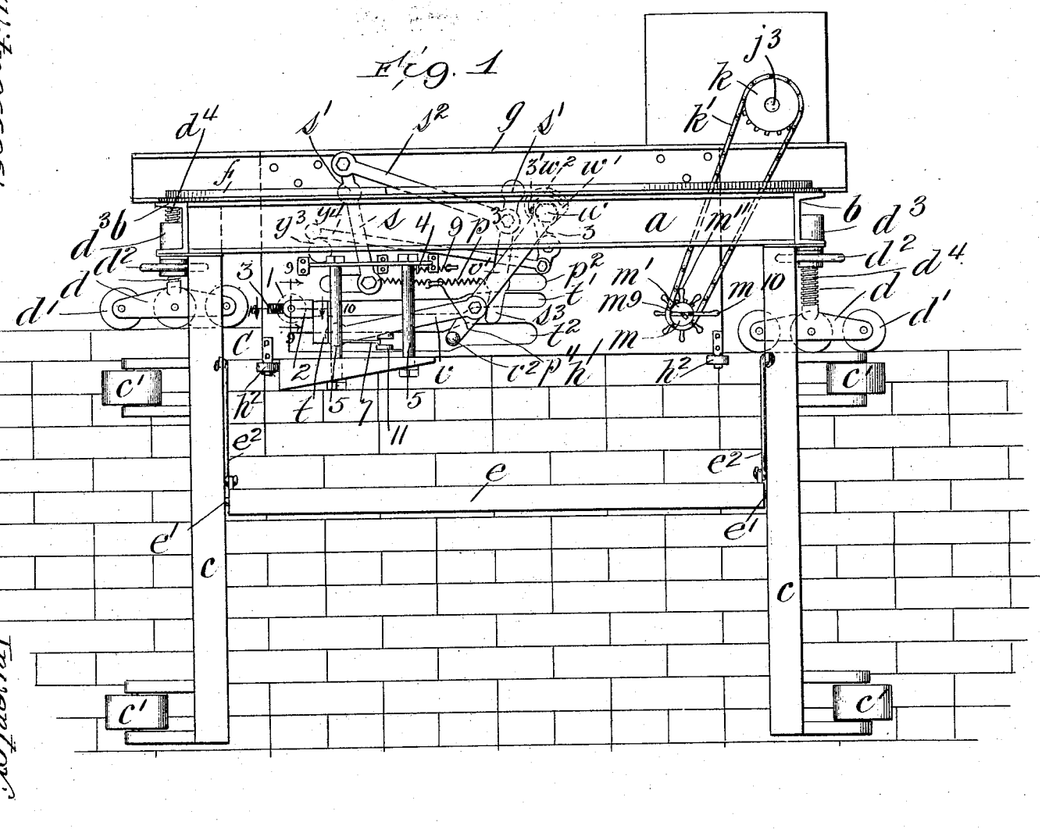
Figure 1 is a general side view of the machine placed upon the wall.
Figure 2:
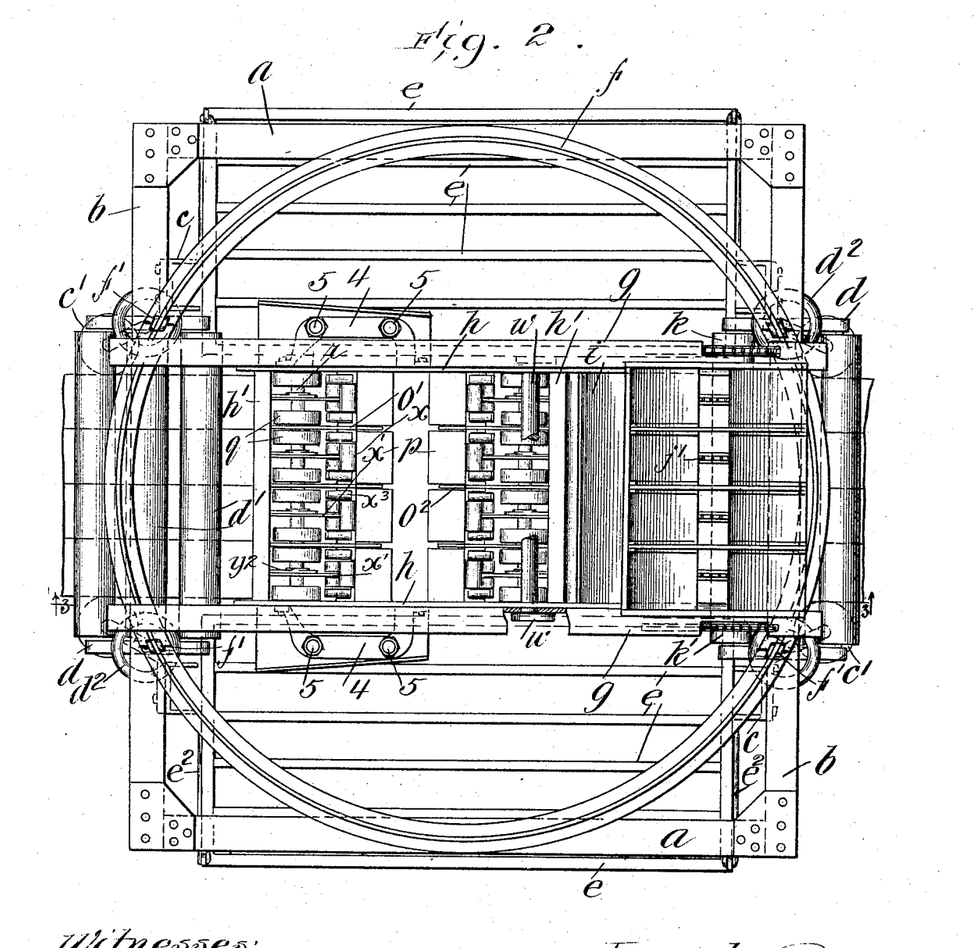
Fig. 2 is a general plan view of the machine.
Figure 3:
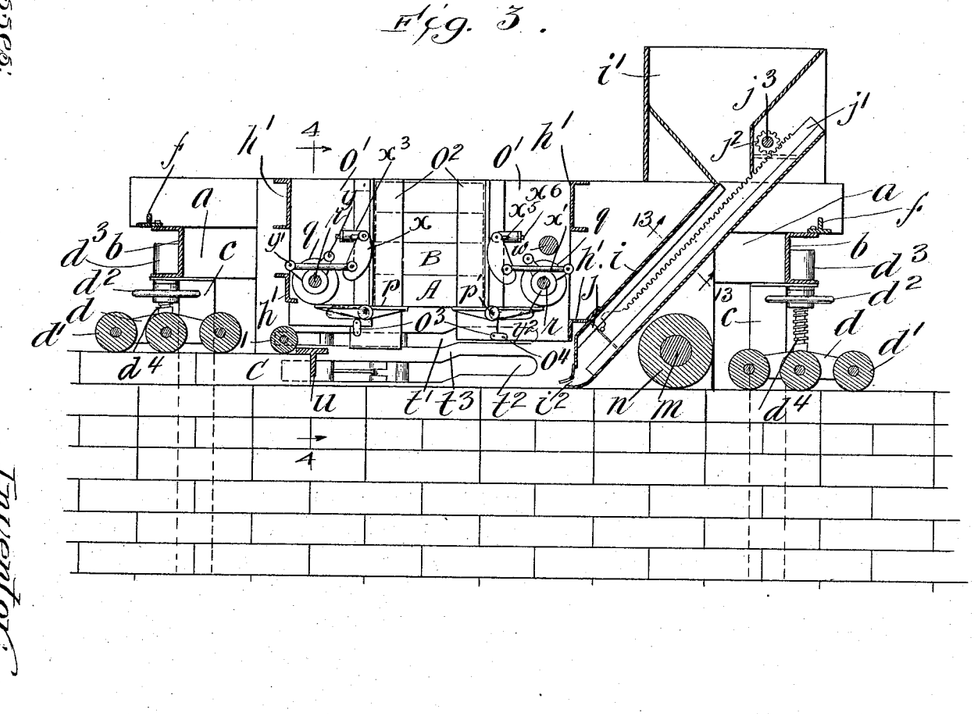
Fig. 3 is a vertical longitudinal section taken on line 3 3, Fig. 2.

*The setting mechanism.*—The precise construction of blocks $t$ is not essential; but in the preferred construction (see Fig. 4) said blocks are U-shaped, with their branches extending horizontally inward through the slots $t'$ $t^2$ in the frame-plates $h$. The base or connecting portion of said blocks lies upon the outside of said plates and is adapted to contact the extensions $s^3$ on the levers $s$. Said slots $t'$ $t^2$ are parallel and substantially horizontal, except that near the forward extremity they rise slightly at a slow bevel, which causes the blocks $t$ to rise slightly during the forward motion and descend slightly during the rearward motion, being guided by the remaining strip $t^3$, lying between slots $t'$ and $t^2$. The incline in strip $t^3$ is designed to impart a downward motion to the setter $u$ during the backward travel to set the bricks, for the blocks $t$ have two functions, one to operate the levers $s$ and the other to support said setter $u$. Said setter consists of a beam, which is preferably T-shaped or angle-shaped in cross-section for engaging the top corner of a brick for setting it. Each of the blocks $t$ is moved forward and back by means of a link $v$, pivotally connected at one end to said block and at the other end to a lever $v'$, fulcrumed on the rock-shaft $w$, journaled in the frame-plates $h$. The lever $v'$ is provided with a handle $v^2$, adapted to be grasped by the operator for operating the machine. By referring to Fig. 1 it will be apparent that when the operator swings the lever $v'$ about its fulcrum the links $v$ will cause the blocks $t$ and setter $u$ to move in an approximately horizontal direction and will cause the levers $s$ to oscillate about their fulcrums $s'$. The rock-shaft $w$ is rigidly fixed to operating-lever $v'$, so that the motion of said lever will cause the rocking of said shaft, this rocking movement being designed to operate the brick-clamping device now to be described.

Figure 14:
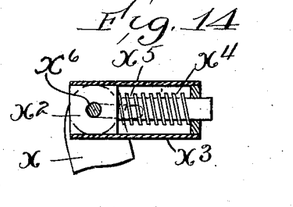
Fig. 14 is a fragmentary side view, partly in section, showing the yielding manner of mounting the upper extremity of the brick-clamps.
Figure 15:
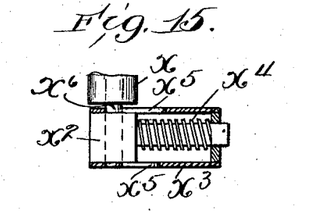
Fig. 15 is similar to Fig. 14, except that the parts are shown in plan.

The brick-clamping device, which is part of the delivering mechanism, is intended to support the column of bricks in the chutes $o$ when the lowest brick in the column is being dropped onto the wall. The clamps $x$ are located at the front and rear walls of the chutes and are arranged in pairs corresponding in number, preferably, to the number of bricks in the width of the wall. These clamps consist of plates or blocks having curved acting surfaces and are pivotally connected near their lower extremity to the links $x'$ $x'$, whereby they are operated, and said clamps are yieldingly supported near their upper extremity, so that they may accommodate themselves to variations in the size of the bricks. Another purpose of this construction is to enable the clamps to raise the column of bricks a slight distance in the chute to thereby relieve the floors $p$ of the weight of the column of bricks above. The yielding mountings in their preferred form (see Figs. 5, 14, and 15) comprise the blocks $x^2$, slidingly mounted in the guide-cylinders $x^3$, with compression-springs $x^4$ interposed between the block and the closed end of the cylinder. Said cylinders are secured to the sides of the plates $h$ and $o'$.

Figure 8:
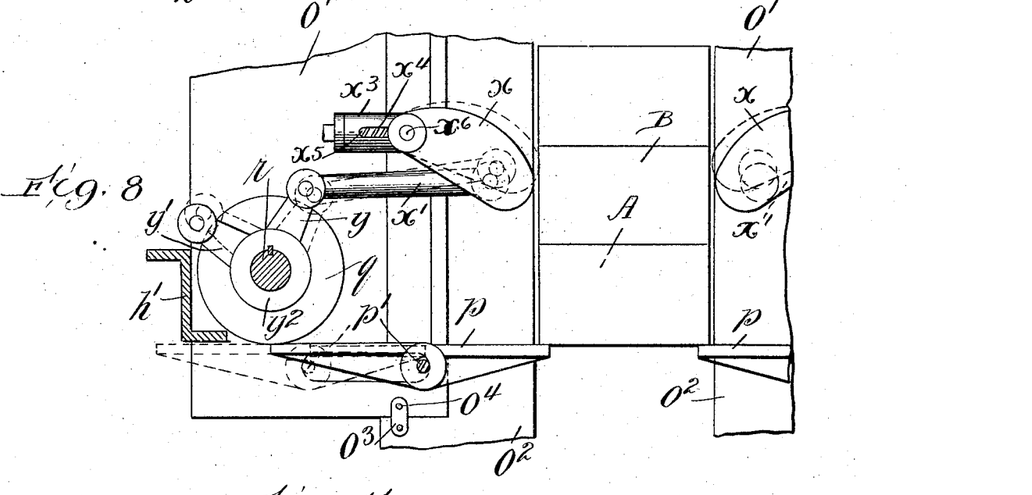
Fig. 8 is a fragmentary view similar to Fig. 5, but showing the delivering mechanism adjusted to operate upon headers—that is to say, bricks laid with their length transverse to the wall.
Figure 9:
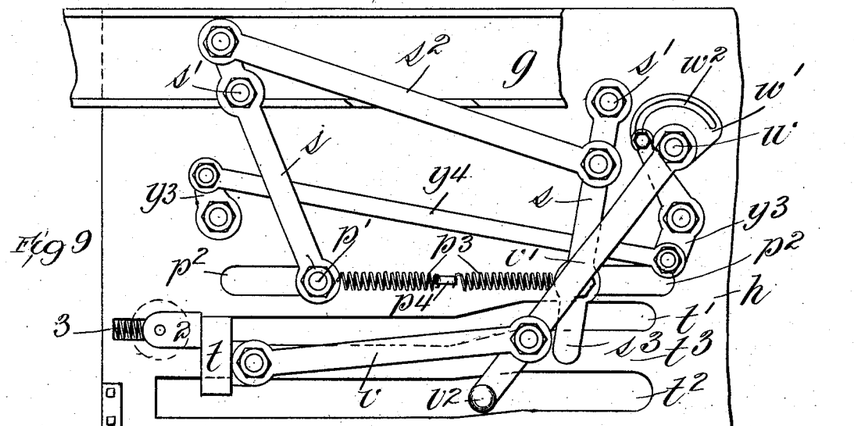
Figs. 9 and 10 are side and plan views, respectively, of the mechanism for operating the clamps, the floors for supporting the bricks in the chute, and the setting member.
Figure 10:
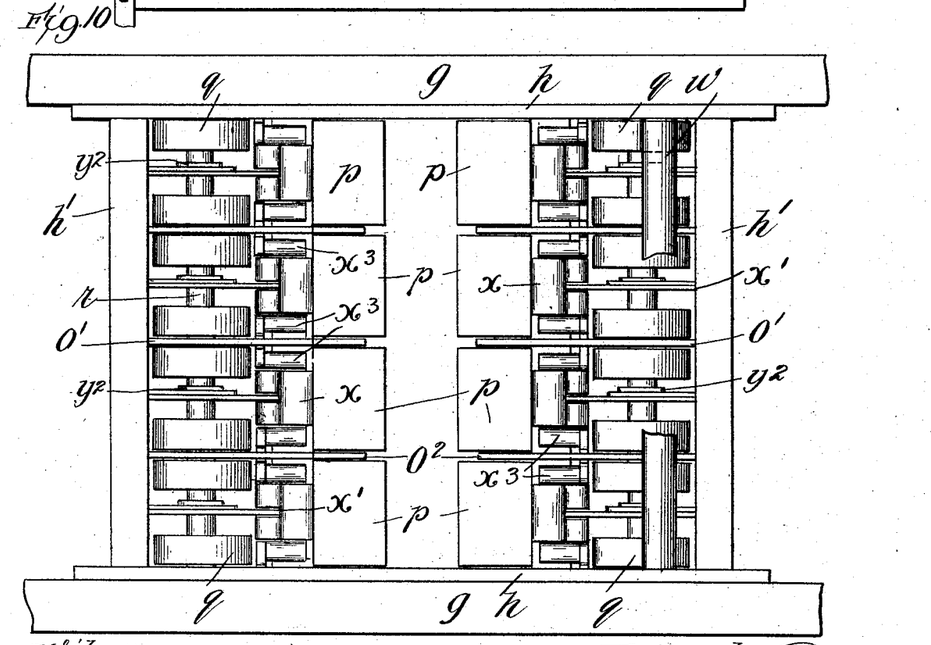
Figures 11, 12:
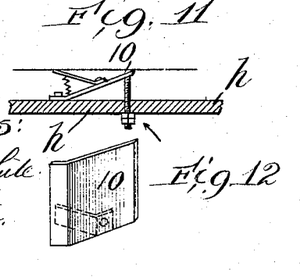

Clamps $x$ are connected to said blocks $x^2$ by means of the pins $x^6$ passing through the slots $x^5$ in the side of said cylinders, with the result that the springs will be compressed and the clamps will yield slightly if the movement of the links $x'$ is too great in any particular instance. Links $x'$ are joined to and operated by the arms $y$ and $y'$, formed on a hub $y^2$, rigidly set upon shafts $r$, so that when said shafts are rocked the clamps $x$ will engage and release the bricks in the chute. The arms $y$ are located nearer to the chutes than are arms $y'$, the purpose being that when links $x'$ are temporarily connected to arms $y'$ the clamps will lie farther apart in condition to hold stretchers—that is, bricks lying lengthwise of the wall, as shown in Fig. 5; but when said links are temporarily connected to arms $y$ the clamps will lie closer together to hold headers—that is, bricks lying crosswise to the wall, as shown in Fig. 8. In order that shafts $r$ $r$ may rotate simultaneously and in opposite directions, each has an arm $y^3$ rigidly secured thereto, the arm on one shaft extending upward and the arm on the other shaft extending downward and these arms being connected by means of the link $y^4$. (Shown in dotted lines, Fig. 5.) Consequently when one of the shafts $r$ is rotated in a direction to bring its clamp in engagement with a brick the opposite clamp will simultaneously move into position to engage the brick from the other side. Power for operating the clamps is preferably received from one only of the shafts $r$, and in the present instance the shaft at the right of the drawings, Fig. 5, is rotated by means of an arm $z$, which is rigidly fastened to said shaft and carries at its free extremity a roller $z'$, adapted to be received and operated by the cam-groove $w^2$ in the cam $w'$, rigidly secured to rock-shaft $w$, and the construction is such that during the greater part of the rotary movement of shaft $w$ the clamps $x$ will be set in active position against the bricks. The period during which the clamps are released is preferably comparatively short and occurs when the floors are in normal or projected position, as shown in Fig. 5.

Figure 6:
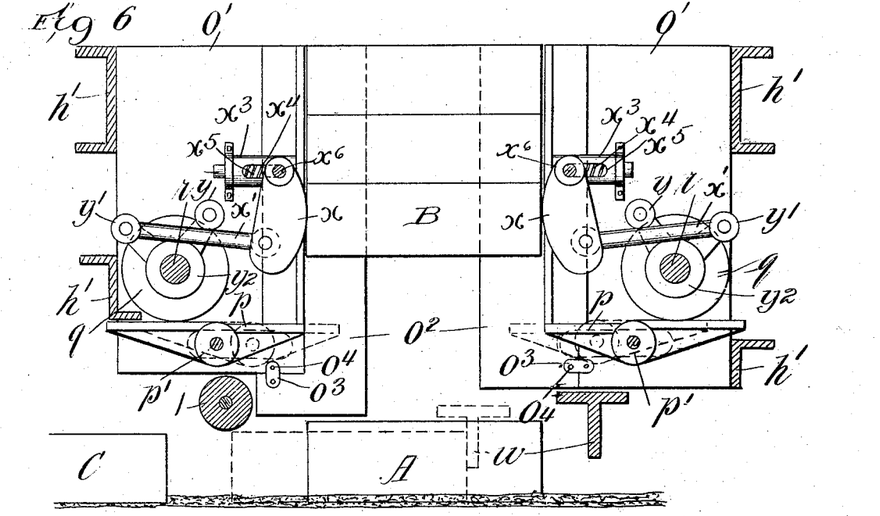
Figure 7:
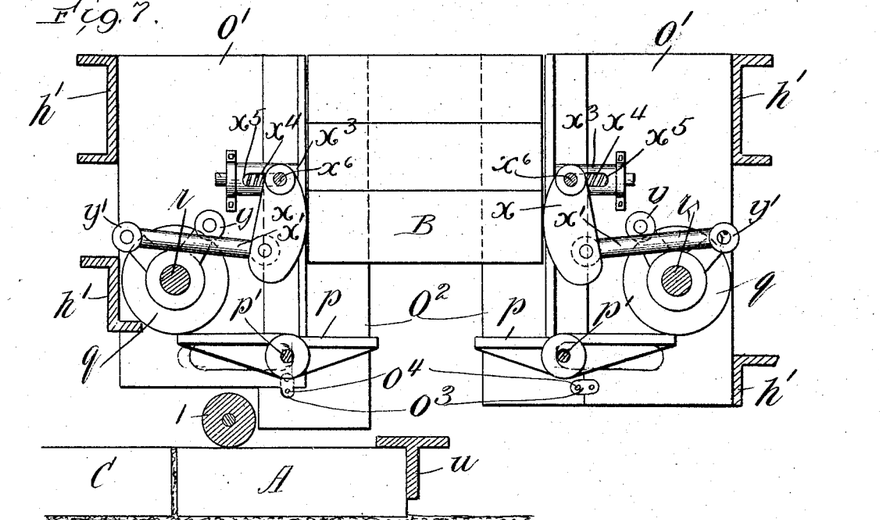

In the regular running of the machine the parts thus far described operate as follows: Starting with the parts in the position shown in Fig. 1, with the operating-lever $v^2$ at the extreme left, the operator grasps the handle $v^2$ and swings the lever $v'$ toward the right. When the parts are in the initial position, the blocks $t$ and setter $u$ will be at the extreme rear point, the brick-supporting floors $p$ will be projected, and the clamps $x$ will be released, all as shown in full lines, Fig. 5. As the lever $v'$ moves toward the right the clamps $x$ will move toward the bricks and will engage the brick B next above brick A resting on the floors $p$. By reason of the curved acting faces of the clamps $x$ and the fact that the upper extremity of said clamps are yieldingly mounted the movement of the links $x'$ toward the bricks will tend to raise the column of bricks slightly off the lower brick A and will thereby relieve the lower brick A of the pressure of the column of bricks above. Floors $p$ will remain unmoved until near the end of the movement of said operating-levers, when the blocks $t$ come into contact with the extensions $s^3$ and cause the retraction of said floors. When the lever has reached its extreme position to the right, the parts will be in the position shown in full lines, Fig. 6, with the setter $u$ in extreme forward position and slightly raised and the clamps $x$ supporting the columns of bricks in the chutes $o$. The lower brick A is then permitted to drop from the chute onto the wall, as shown in Fig. 6. As the operator begins to move the lever toward the left the blocks $t$ move the setter $u$ rearwardly and downwardly to engage brick A and at the same time permit the springs $p^3$ to return the floors $p$ to normal position. A bed of mortar has been previously spread on the top of the wall from the mortar-chute $i$, and the backwardly-moving setter $u$ will shove brick A backward along the wall toward the last-set brick C. The rearward movement of brick A along the wall causes the mortar to be thrown up so as to form a bedding of mortar between bricks A and C for the end joint of the brick. This backward movement of the brick on the mortar produces what is called a "shove-joint," which has advantages well recognized by those skilled in the arts. Before the operating-lever has reached its extreme left or initial position brick A has been brought to a final bed against brick C, and the condition and relative position of the parts are illustrated in Fig. 7. The operator, however, continues to move the lever toward the left, and as brick A can move no farther it occurs that the entire machine is caused to move forward along the wall. The motion of the lever toward the left is continuous until the machine has been advanced a distance substantially equal to the length of a brick, and by this time the clamps $x$ are temporarily released and the column of bricks permitted to descend onto the floors $p$. The forward movement of the machine along the wall causes the rotation of the friction-roller $n$, with the result that the shaft $m$ is rotated, thus driving shaft $j^3$ and causing the pinion $j^2$ to lower the plunger $j$ in the mortar-chute a certain definite distance previously determined to deliver the proper amount of mortar onto the wall. This completes the single period of operation and the parts are ready for the laying of the next brick.

There is special reason why it is desirable that the floors $p$ should not commence to be retracted until the setter $u$ has nearly reached the forward limit of its movement, and the reason is that in laying headers at one face of the wall and stretchers at the other face thereof it is necessary to drop two headers onto the wall for every one stretcher so dropped. There is indicated in Fig. 5 in dotted lines a column of headers in the chute $o$, these headers resting merely upon the edge of the floors $p$ when said floors are in normal position. A slight movement of said floors will be sufficient to drop a header and still retain a stretcher; but the travel of setter $u$ must be almost as great for laying a header as it is for laying a stretcher. Consequently in order that the setter $u$ may have its necessary movement in both cases the parts are so constructed that the movement of the floors will not commence until the setter has practically completed its first and forward motion. In other words, the object is for the machine to be able sometimes to drop and set a header without dropping a stretcher, and as the setting action must take place in both instances the dropping action is arranged to take place near the end of the first or forward movement of the setting member. By varying the distance, therefore, to which the operating-lever $v'$ is moved it is possible to control whether a header or both a header and a stretcher shall be dropped. Of course this distinction will not be necessary if all the bricks in a course are to be either headers or stretchers; but it will be necessary where a course is to be laid which at any point consists partly of headers and partly of stretchers. By properly arranging the partition-plates $o'$ and clamps $x$ any combination of headers and stretchers may be laid.

Figures 20, 22:
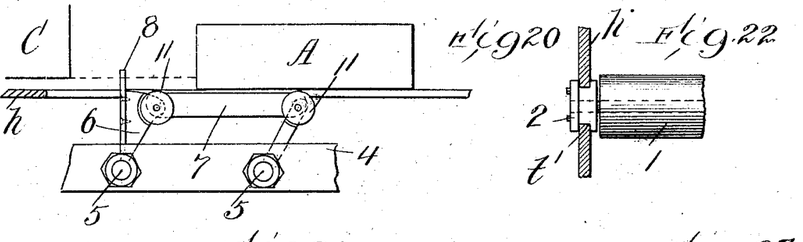
Fig. 20 is a fragmentary plan view of the alining mechanism.
Fig. 22 is a fragmentary detail view, partly in vertical section, showing the manner of mounting the top setting-roller.
Figure 23:
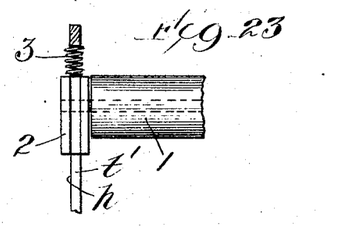
Fig. 23 is a fragmentary plan view similar to Fig. 22.

It is necessary to provide means for forcing the brick down to its bed in the wall so that all the bricks of a course will lie at the same level, and this is accomplished by means of the roller $l$, which has a journal-bearing in the boxes 2, adapted to slide horizontally in the slot $t'$ in the frame-plates $h$, as shown in detail in Figs. 22 and 23. Between the rear end of the sliding boxes 2 and the rear end of said slots $t'$ is placed a compression-spring 3, so that said rollers and the boxes 2 may yield when the setter $u$ is near its extreme rear position. As soon as said setter commences to move forward the boxes 2 and rollers 1 are released and permitted also to move forward under the influence of said spring 3, so as to set the front extremity of the newly-laid brick down to its proper level.

Figure 21:
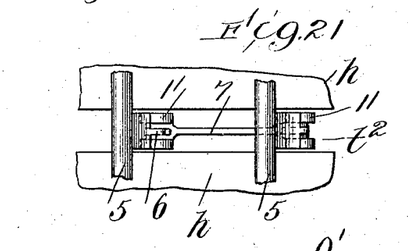
Fig. 21 is a side view of the same.

*The alining mechanism.*—In order to produce a layer of mortar at the inside of the brick to form a side joint, it is desirable to shove the brick laterally inward into the wall upon the layer of mortar. This is accomplished by holding the bricks in the chute at a slight distance apart and provide alining mechanism for pushing the bricks inwardly after they have been dropped onto the wall. The thickness of the partition-plates $o'$ in the chutes $o$ causes the bricks to drop with a proper space between them, and the mechanism which brings the brick laterally into place is shown in detail in Figs. 20 and 21. Extending outwardly from the frame-plates *h h* are the two brackets 4 4, which revolubly support the upright rods 5 5. Each of said rods has an arm 6, extending toward the wall and carrying at its extremity the alining-bar 7. It is desirable to provide alining rollers 11 11 at the extremities of said bar for making final contact with the brick to set it in position. The arm 6 lying nearest the rear of the machine—that is to say, toward the left—has an extension 8, which projects to a point inside of the outside edge of the brick about to be laid, so that when said brick is shoved rearwardly it will engage said extension. When in normal position, the bar 7 lies slightly forward of the vertical rods 5, and therefore when said extension 8 is pushed rearwardly said alining-bar 7 will swing inward toward the wall. The extension 8 is short enough so that when brick A has reached its final position said extension will swing out of contact with the bricks in the wall. The alining bar subsequently tends to assume its normal position by reason of the influence of the spring 9, one end of which is connected to the bracket 4 and the other end to an adjacent one of the arms 6.

In order to remove the excess mortar and smooth the joint, it is desirable to attach a scraper 10 inside of the wall *h* at the top of the last-laid course.

Although I have minutely described the several parts of the machine here illustrated, I am aware that considerable variation may be had without departing from the spirit of my invention.

What I claim as new, and desire to secure by Letters Patent, is—

1. In a brick-laying machine, the combination of a frame adapted to move in either direction lengthwise of the wall and brick-laying mechanism revolubly supported therein whereby the machine is reversible and adapted to operate in either direction.

2. A brick-laying machine, comprising a carriage adapted to move lengthwise of the wall in either direction, and a frame adapted to carry the operating parts of the mechanism, said frame being revolubly supported upon the carriage whereby the machine is operable in either direction.

3. In a brick-laying machine, the combination of a carriage adapted to travel lengthwise of the wall in either direction, a circular track upon said carriage, an inner frame adapted to rotate upon said track, means for fastening said inner frame in position upon said track and brick-laying parts mounted upon said frame.

4. In a brick-laying machine, the combination with the operating parts of a carriage adapted to travel lengthwise of the wall in either direction, a circular track upon said carriage, an inner frame for supporting the operating parts and casters adapted to run upon said track for supporting the inner frame thereon, said casters being movably attached to said frame whereby they may be thrown out of operative relation to the track during the brick-laying process.

5. In a brick-laying machine, the combination with the operating parts, of a carriage for supporting said operating parts, and trucks for supporting said carriage upon the wall, said trucks being vertically adjustable whereby the carriage may be held level although the trucks rest upon different courses of bricks.

6. In a brick-laying machine, the combination with the operating parts, of a carriage for supporting said operating parts, trucks near opposite ends of said carriage for supporting the same upon the wall, one of said trucks being adapted to rest upon the course of bricks which is in process of being laid, and the other of said trucks being adapted to rest upon the prior-laid course of bricks.

7. In a brick-laying machine, the combination with the operating parts, of a carriage for supporting said operating parts, trucks for supporting the same upon the wall, one of said trucks being adapted to rest upon the course of bricks which is in process of being laid, and the other of said trucks being adapted to rest upon the prior-laid course of bricks; and means for separately adjusting said trucks vertically whereby the carriage may be made level no matter which of the trucks is upon the prior-laid course of bricks.

8. In a brick-laying machine, a machine-frame adapted to move lengthwise of the wall and a member adapted to reciprocate in said frame in a direction lengthwise of the wall, said reciprocating member being adapted to engage some part of the wall for advancing said frame along the wall.

9. In a brick-laying machine, a setting member adapted to move forward and rearward in the machine for the double purpose of setting the brick and advancing the machine, and means for operating said setting member, said machine being free to move lengthwise along the wall whereby the travel of the setting member first sets the brick and in the same movement advances the machine along the wall.

10. In a brick-laying machine, a setting member adapted to move forward and rearward in the machine for the double purpose of setting the brick and advancing the machine, and a carriage supported and guided solely by the wall itself for carrying said setting member.

11. In a brick-laying machine, a chute for containing a supply of bricks, a pair of floors located at opposite sides of the chute at the bottom thereof for holding the bricks therein, and connections from one of said floors to the other whereby the movement of one produces a corresponding movement in the other for permitting the delivery of bricks from the chute onto the wall.

12. In a brick-laying machine, a storage-chute for the bricks, a pair of floors located at opposite sides of the chute at the bottom thereof for supporting the bricks, levers connected to said floors for moving the same toward and from each other for delivering bricks to the top of the wall, a link connecting said levers on opposite sides of their fulcrums for constraining said levers to operate simultaueously, and means for operating one of said levers.

13. In a brick-laying machine, a chute for containing a supply of bricks, means for moving said chute a definite distance lengthwise of the wall, a floor at the bottom of said chute for supporting the bricks therein and means for automatically retracting and projecting the floor once during a single forward movement of the machine on the wall.

14. In a brick-laying machine, a chute for containing a supply of bricks, a pair of floors located at the bottom of the chute for holding the bricks therein, said floors being movable toward and from each other at the bottom of the chute for controlling the delivery of bricks therefrom; and a clamping device for retaining all but the lowest brick when said floors are in a retracted position.

15. In a brick-laying machine, the combination of a brick-chute for containing the bricks, means for temporarily supporting the bricks in the chute and clamps located on opposite sides of the chute for temporarily engaging a brick to retain all but the lowest brick in the chute when the first-mentioned supporting means are out of operative position.

16. In a brick-laying machine, the combination of a chute for the storage of bricks, a floor movably mounted at the mouth of the chute for controlling the exit of bricks therefrom, and a clamping device for retaining the bricks above the lowest brick when said floor is away from the bottom of the chute, and connections between said floor and said clamping device for causing them to act coöperatively.

17. In a brick-laying machine, a brick-chute, clamps for temporarily supporting the column of bricks in the chute, a yielding support for said clamps, means connected to said clamps at a point remote to said yielding supports for operating said clamps and means for preventing the escape of bricks from the chute when said clamps are in inoperative position.

18. In a brick-laying machine, a brick-chute, clamps located on opposite sides of said chute and having curved acting faces for engaging a brick, means attached near the lower extremity of a clamp for forcing the same toward the brick, and a yielding support near the upper extremity of the clamp whereby the forcing of the lower extremity of the clamp toward the brick tends to slightly raise the bricks in said chute.

19. In a brick-laying machine, a brick-chute, a brick-supporting floor slidably mounted at the bottom of said chute, clamps located on opposite sides of said chute and having curved acting faces for engaging a brick, means attached near the lower extremity of a clamp for forcing the same toward the brick, and a yielding support near the upper extremity of said clamp whereby the forcing of the lower extremity of the clamp toward the brick tends to slightly raise the bricks in said chute for relieving said floor of the weight of the column of bricks.

20. In a brick-laying machine, the combination of a brick-storage chute, floors at the bottom thereof for temporarily retaining the bricks in said chute, said floors being movable into and from said chutes, clamps located in position to engage the second brick located at least the thickness of one brick above said floors, links for operating said clamps, rock-shafts for operating said links, arms on said rock-shafts extending in opposite directions therefrom and a link connecting said arms whereby the rotation of said rock-shafts is simultaneous and opposite in direction.

21. In a brick-laying machine, the combination of a machine-frame movable lengthwise of the wall, a setting member mounted in said machine-frame for shoving a brick lengthwise upon the wall, a storage-chute for bricks mounted in said machine-frame, floors for permitting the delivery of bricks from the chute to the top of the wall, clamps for retaining part of the supply of bricks in the chute, and connections between said setting member, said floors and said clamps, whereby the complete movement of said setting member automatically operates said floor and said clamps.

22. In a brick-laying machine, the combination of means for shoving the brick lengthwise of the wall and an alining device consisting of a swinging member hung in the machine-frame in such position that its path intersects the path of the brick, and a projecting arm on said swinging member for operating the same, said projecting arm being adapted to be engaged by the brick during its lengthwise movement along the wall to thereby swing said swinging member for imparting a lateral movement to the brick.

23. In a brick-laying machine, the combination, with the machine-frame, of a setting member for shoving the brick lengthwise of the wall, an alining member having rollers for contacting the side of a brick, two horizontally-swinging arms pivotally connected to said alining member at different points thereon for supporting the same, the path of the rollers on said alining member being substantially tangent to the plane of the surface of the wall, and means for automatically swinging said member when the brick is shoved backward by said setting member.

24. In a brick-laying machine, a setting-bar adapted to engage the top and end of a brick, and means for moving said bar forward and backward in the machine for setting the brick, and guides near the two ends of said bar for guiding the same downward as well as rearward in setting the brick.

25. In a brick-laying machine, a setting-bar adapted to engage the top corner of a brick, a pair of parallel vertical frame-plates having slots therein extending, in the main, horizontally but having inclined portions sloping down toward the rear of the machine, and blocks traveling in said slots for supporting said setting-bar, whereby the rearward motion of said blocks causes the rearward and downward motion of said setting member in setting the brick.

26. In a brick-laying machine, the combination of clamps for alternately retaining the bricks and dropping them one at a time upon the wall, a setting member adapted to move fore and aft to shove the brick lengthwise to bed, said clamps being actuated by said setting member whereby the delivery of a brick is consequent upon the action of the setting member.

In witness whereof I have hereunto subscribed my name in the presence of two witnesses.

JOHN THOMSON.

Witnesses:
   HOWARD M. COX,
   J. I. McDONALD.